No. 882,032. PATENTED MAR. 17, 1908.
T. L. VALERIUS.
ICE CREAM FREEZER.
APPLICATION FILED JULY 28, 1906.

2 SHEETS—SHEET 1.

Witnesses:
Inventor:
Theodore L. Valerius,

No. 882,032.

PATENTED MAR. 17, 1908.

T. L. VALERIUS.
ICE CREAM FREEZER.
APPLICATION FILED JULY 28, 1906.

2 SHEETS—SHEET 2.

Witnesses:
H. S. Austin
John R. Lefevre

Inventor,
Theodore L. Valerius
by
Charles Vincent Hawley
Atty.

UNITED STATES PATENT OFFICE.

THEODORE L. VALERIUS, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

ICE-CREAM FREEZER.

No. 882,032.        Specification of Letters Patent.       Patented March 17, 1908.

Application filed July 28, 1906. Serial No. 328,223.

*To all whom it may concern:*

Be it known that I, THEODORE L. VALERIUS, a citizen of Fort Atkinson, county of Jefferson, and State of Wisconsin, have invented a certain new, useful, and Improved Ice-Cream Freezer, of which the following is a full, clear, and exact description, such as will enable others skilled in the art to which it appertains to make and use the same.

My invention relates to the art of manufacturing ice cream and the like and has special reference to improvements in ice cream freezers.

The primary object of my invention is to provide means whereby a liquid such as ice cream custard, may be reduced to a semi-frozen state for subsequent solidification in suitable storage vessels.

A further object of the invention is to provide apparatus whereby the process of freezing ice cream and the like may be carried on continuously.

Other and particular objects of the invention are, to reduce the cost of large capacity ice cream freezers;—to reduce the labor of operating ice cream freezers; to reduce the power required for the operation of the apparatus;—to make it easier to maintain the apparatus in sanitary condition;—and to insure a gain in the volume of the product of the apparatus;—all in comparison with present day ice cream freezers.

My invention consists generally in an ice cream freezer comprising an annular liquid vessel mounted for rotation upon a vertical axis and open at the top, in combination with means for continuously chilling the inner wall of said annular vessel, a suitable, preferably stationary scraper arranged within said vessel for clearing said inner wall, means for rotating said vessel and means at the top of said vessel for receiving and discharging the semi-frozen liquid.

My invention also consists in a plural stage ice cream freezer comprising several devices of the above description arranged in tandem or in series, whereby the process of freezing begun in one is completed in another.

My invention also consists in various details of construction and in combinations of parts, all as hereinafter described and particularly pointed out in the claims.

Figure 1:
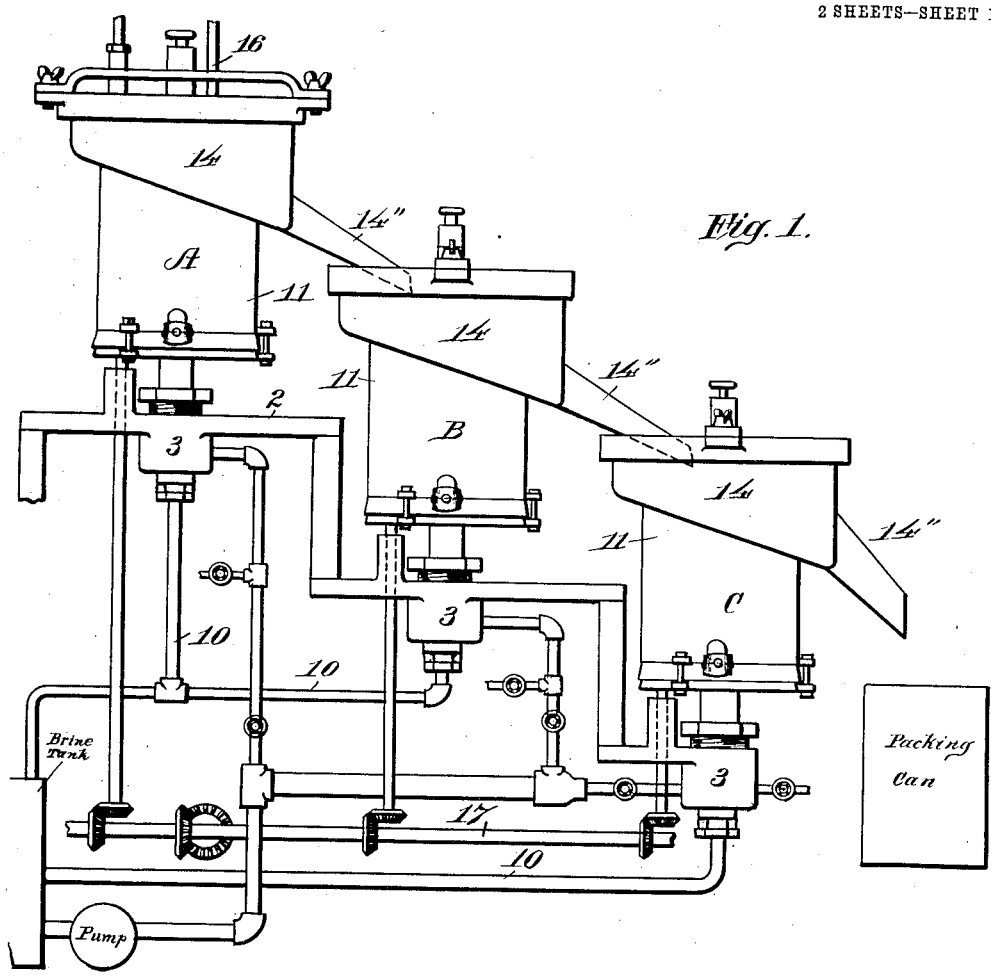
Figure 3:
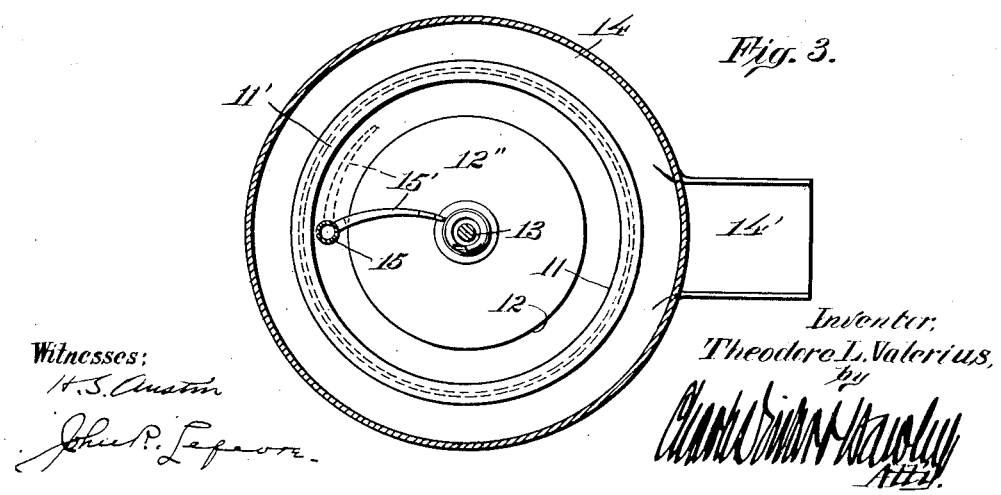
Figure 2:
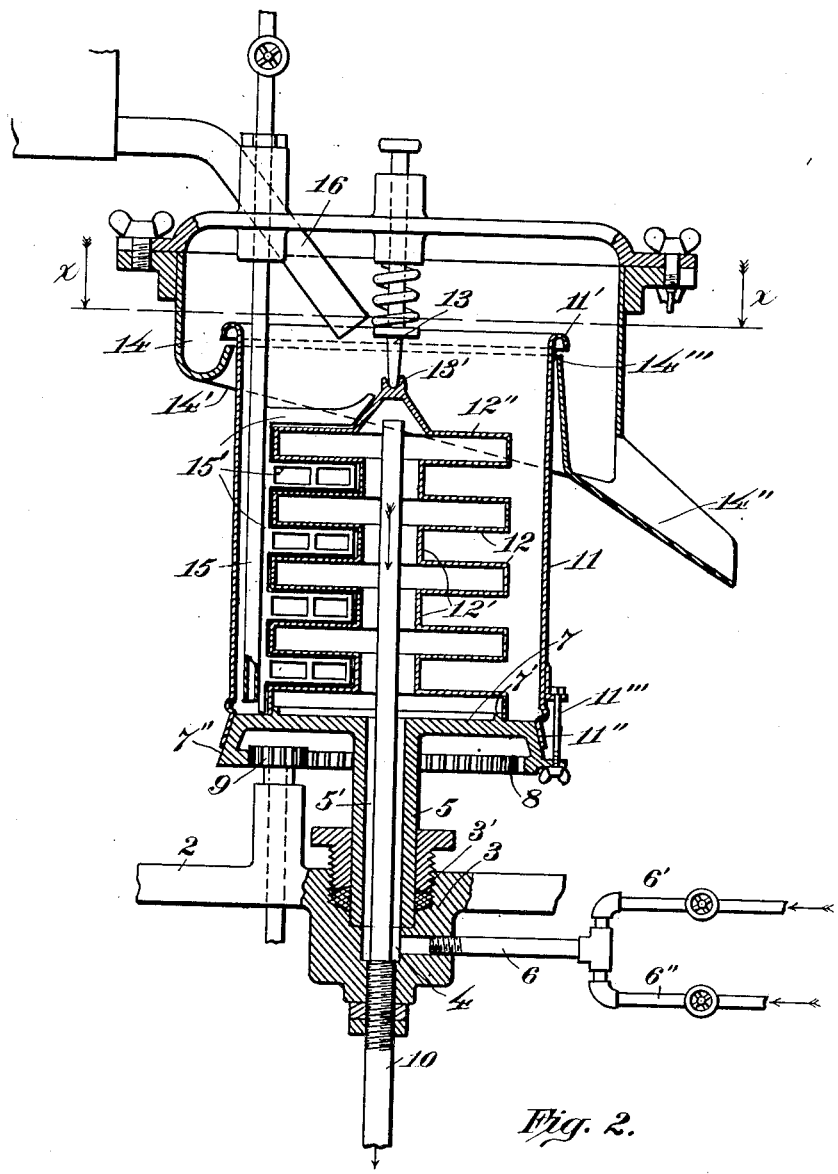

My invention will be more fully understood by reference to the accompanying drawings forming a part of this specification and in which;

Figure 1 illustrates an ice cream freezer or apparatus embodying my invention; Fig. 2, is an enlarged vertical section of one of the freezers; and Fig. 3, is a horizontal section on the line X—X of Fig. 2.

I shall first describe a single element or freezer to the end that the operation of an individual device may be understood and will then explain the operation of the complete apparatus.

Referring to Fig. 2, 2, represents a suitable base or frame and 3, a member framed with or supported by the part, 2. The part 2, contains a vertical shaft bearing, 3, having a cavity, 4. The bearing contains the shaft 5, adapted to rotate freely therein. The shaft 5, is hollow, containing a passage or duct, 5′, which communicates with the space, 4. 6, is a liquid supply pipe having two branches, 6′ and 6″, both valved. The freezing fluid from the pipe, 6, enters the space, 4, and thence passes upward through the duct, 5′. At the upper end of the shaft, 5, is a disk or circular portion, 7, preferably integral with the shaft, 5. The top of the disk has an annular rib, 7′, for a hereinafter explained purpose. The periphery of the disk is a cone, 7″. 8, is a gear formed in or upon the bottom of the disk. The disk is rotated by a suitably driven pinion, 9, meshing with the internal gear, 8. A pipe, 10, that rises through the bearing, 3, and through the shaft, 5, serves as the return pipe whereby the liquid which passes through the shaft, 5, returns to a tank. The pipe, 10, is secured tightly in the lower end of bearing, 3, and the joint between the shaft, 5, and the bearing, 3, is closed by stuffing box, 3′. Leakage of liquid from the hollow bearing is therefore prevented. The annular cream vessel before alluded to comprises the outer wall, 11, and the inner wall, 12. Its bottom is formed by the disk, 7. The outer wall of the vessel is preferably a plain sheet metal cylinder, flanged outwardly at the top (see flange 11′) and at the bottom having a flaring or conical end, 11″, which fits upon the cone surface of the disk, 7. The fastening 11″ between the disk and the cylinder, 11, may be of any suitable design. By means thereof the cylinder is detachably secured on the disk, hence the cylinder may be removed when necessary to clean the machine, and it will be noted that the removal of the cylinder, 11, completely exposes the inner wall of the freezer thereby facilitating the cleaning of that wall. I apply the freezing fluid to the inner wall of my freezer. As the height or stand of cream which may be advantageously maintained in an ice cream freezer is limited, too great a height imposing objectionable compression upon the semi-frozen cream, and as the capacity and efficiency of the freezer depend upon the area of the chilled or chilling wall, I give my machine the requisite capacity by making the cream vessel large in diameter and by corrugating the inner wall of the vessel. This accounts for the peculiar form of the inner wall shown in the drawings. The corrugations are deep and are circumferential. It is obvious that a spiral corrugation could be employed, but such would be objectionable as it would be difficult to scrape a spirally grooved wall.

Further referring to Fig. 2, it will be seen that the inner wall, 12, has the form of a plurality of hollow disks placed one upon the other. The bottom of the lower disk or circular chamber is formed by the carrying disk, 7, and as shown, the whole inner wall is centered by the rib, 7', on said disk, 7. The hubs, 12', of the hollow disks are of considerably greater diameter than the central return pipe, 10, and the freezing fluid which rises through the shaft, 5, completely fills the space within the inner wall, 12. The top 12'', of the upper disk closes the top of the fluid chamber and the freezing fluid overflows from the upper disk into the return pipe, 10. I prefer to employ a brine tank and pump, as indicated in Fig. 1, and the brine, being constantly circulated, maintains a low temperature throughout the inner wall, 12. It will be understood that the disk, 7, the cylinder, 11, and the corrugated inner wall, 12, all rotate together. To somewhat relieve the shaft, 5, and bearing, 3, I provide a spring or removable center point, 13, in the upper frame, 3, seating the point in a journal, 13', on the top of the upper hollow disk. Supported on the frame and surrounding the upper end of the freezer can or vessel is an annular cream receiving chamber or cup, 14, having an inclined bottom, 14', and at its lowermost point provided with a discharge chute or spout, 14''. The inner edge, 14''', is beneath the top flange 11' of the vessel. The semi-frozen liquid therefore discharges across the top of the flange, 11', into the receiver, 14. The scraper of my machine, which also operates as an agitator, comprises the vertical pipe, 15, and a plurality of fingers, 15', extending into the corrugations of the can. The fingers have the form of light frames and are slightly smaller than the corrugations that contain them, so that the fingers do not scrape upon the metal wall, 12. The fingers being held stationary serve to scrape the frozen material from the rotating walls of the can, but, as they contain large openings, do not constitute a complete barrier to the rotation of the body of liquid within the freezer can. The pipe or stem of the scraper is removable from the frame, 3, the bearing therefore in said frame being of such form that the pipe may be drawn out after it is partially rotated to remove the fingers from the corrugation of the can, as shown in Fig. 3. In practice an air tube is connected to the valved upper end of the hollow scraper-stem and a small quantity of air is blown from the lower end of the pipe into the lower part of the body of cream or custard in the can. The supply of liquid to be frozen enters the freezer can through a pipe or spout, 16, arranged to deliver the cream upon the top of the upper hollow disk, or if desired, to the lower part of the can. It is obvious that the custard may enter the can through the stem of the scraper if desired.

The freezer thus far described is complete in itself and the inflow of liquid being so restricted as to cause the slow rise and discharge of cream at the top of the can, may be used to produce ice cream ready for packing in refrigerating cans or molds. I prefer, however, to increase the capacity of my apparatus by increasing the supply or flow of custard and by dividing the work to be done between two or more such freezers. As shown in Fig. 1, I arrange the freezing cans in series or tandem, arranging them one above the other. The fact that the freezer can discharges the partially frozen cream from its open top permits this to be done. The freezers are arranged upon a step like frame and the cream descends from one can to the next until finally discharged in the desired state or condition at the spout of the lowermost freezer. As shown in Fig. 1, the arrangement is such that all of the cans are driven from a single power shaft, 17. All of the return pipes, 10, lead to the brine tank, and all of the cooled brine pipes are joined to the pump. As before stated each supply pipe, 6, has two connections; the first connected with the brine pump, the second, connected with a steam boiler, it being desirable that a supply of steam should be at hand to increase the temperature of the inner wall of the freezer in case the cream cakes thereon and also for the purpose of sterilizing the can after it has been washed.

The operation of the apparatus is as follows: A sufficient quantity of cold brine or other refrigerating agent being provided, the brine valve of the freezers are opened and the pump is started. The inner chambers of the freezers quickly fill with brine and thereafter the circulation is maintained in all the cans. The cans are then started into rotation and the dashers or scrapers being in position a supply of custard is admitted to the upper-most freezer, A. Falling to the bottom of the freezer can, the custard slowly rises therein and being deprived of its heat is slowly congealed. Contact with the rotating surfaces of the can and with the scraper or dasher prevents separation of the ingredients of the custard. Likewise the air which is admitted at the bottom of the can tends to lighten the cream and increase its volume. The freezing of the liquid causes it to expand and, becoming lighter, it floats to the top, where, the supply of fresh custard continuing, it finally rises to the top of the can and is by centrifugal force and gravity discharged into the receiver 14. The rotation of the freezer can need not be rapid and the force with which the cream is discharged from the top of the can is little more than enough to cause the semi-frozen liquid to fall into the receiver. The deflation of the cream is thus avoided. The partially frozen liquid passes through the second stage of freezing in the intermediate freezer, B, and the performance of the process is completed in the lower freezer, C, from which the frozen product is discharged into refrigerating cans or molds, wherein the cream is subsequently further cooled and solidified.

My invention is not restricted to the use of a plurality of freezers in the manner indicated in Fig. 1; but, given freezers of certain dimensions the capacity, of the apparatus depends on the number of freezers employed in the series.

As it is obvious that numerous modifications of my invention will readily suggest themselves to one skilled in the art, I do not confine my invention to the specific constructions herein shown and described.

Having thus described my invention, I claim as new and desire to secure by Letters Patent:

1. In an ice cream freezer, an internally cooled annular and externally exposed vessel mounted for rotation upon a vertical axis and open at the top for the discharge of frozen cream therefrom, substantially as described.

2. In an ice cream freezer, an internally cooled and externally exposed annular vessel mounted for rotation upon a vertical axis and open at the top for the discharge of frozen cream therefrom, in combination with a dasher within said vessel, substantially as described.

3. In an ice cream freezer, an internally cooled and externally exposed vessel containing an annular space open at the top to receive and contain the liquid to be frozen mounted for rotation upon a vertical axis, in combination with a stationary dasher within said annular space, and means at the top of the vessel to receive frozen cream therefrom substantially as described.

4. In an ice cream freezer, an internally cooled annular or ring-like vessel mounted for rotation upon a vertical axis and open at the top for the discharge of semi-frozen liquid, in combination with means at said top for receiving and discharging the semi-frozen liquid therefrom, substantially as described.

5. In an ice cream freezer, an externally exposed and internally cooled annular vessel, mounted for rotation as one part or member upon a vertical axis and open at the top for the discharge of frozen cream therefrom, substantially as described.

6. In an ice cream freezer, an externally cooled annular vessel, mounted for rotation upon a vertical axis and open at the top for the discharge of frozen cream therefrom, in combination with a dasher within said vessel, substantially as described.

7. In an ice cream freezer, an externally exposed and internally cooled annular vessel, mounted for rotation upon a vertical axis and open at the top for the discharge of frozen cream therefrom, in combination with a stationary dasher within said vessel, substantially as described.

8. In an ice cream freezer, an externally exposed and internally cooled annular vessel, mounted for rotation upon a vertical axis and having a flange or rim at the top, in combination with means at said top for receiving the semi-frozen liquid from said flange, substantially as described.

9. A plurality of internally cooled freezer cans, in combination with means for rotating the same, the tops of said cans being open and means for transferring the semi-frozen liquid from one can to the next can, substantially as described.

10. A plurality of annular internally cooled freezer cans, each mounted for rotation upon a vertical axis, dashers in said can, means for continuously supplying liquid to be frozen to one of said cans, and means for transferring the semi-frozen liquid from said can to the next can, whereby the freezing process is made continuous, substantially as described.

11. In an ice cream freezer, an internally cooled annular can mounted for rotation upon a vertical axis, in combination with means for rotating said can, means at the top of said can for transferring semi-frozen liquid therefrom to another receptacle, a dasher arranged in said can and adapted to scrape the cooled walls thereof, and the inner and outward walls of said can being separable, substantially as described.

12. In an ice cream freezer, a rotary bottom, in combination with a cylinder detachably secured thereto, a corrugated inner wall rising from said bottom, means for circulating cooling fluid within said inner wall and means at the top of said cylinder for the discharge of semi-frozen liquid, substantially as described.

13. In an ice cream freezer, a rotary bottom, in combination with a cylinder detachably secured thereto, a corrugated inner wall rising from said bottom, means for circulating cooling fluid within said inner wall, a dasher having fingers within the corrugations of said inner wall and means at the top of said cylinder for the discharge of semi-frozen liquid, substantially as described.

14. In an ice cream freezer, an internally cooled freezer can, mounted for rotation upon a vertical axis, and having an annular space to receive and contain the liquid to be frozen said space being open at the top in combination with means for rotating said can, means at the top of the can to receive semi-frozen liquid from the rim thereof, a dasher within said annular space and means also therein for injecting air near the bottom of said can, substantially as described.

15. In an ice cream freezer, a rotary bottom, in combination with a cylindrical wall rising therefrom, an inner wall or body rising from said bottom and composed of a plurality of internally connected hollow disks, means for supplying liquid thereto and a return pipe therein, substantially as described.

16. In an ice cream freezer, a rotary bottom, in combination with a cylindrical wall rising therefrom, an inner wall or body rising from said bottom and composed of a plurality of internally connected hollow disks, means for supplying liquid thereto, a return pipe therein, and a stationary dasher, substantially as described.

17. In an ice cream freezer, a freezer can or vessel, comprising a bottom, in combination with a cylindrical outer wall having an outwardly flared top or rim and an inner wall composed of a plurality of internally connected hollow disks, closed at the top, to contain freezing fluid, substantially as described.

18. In an ice cream freezer, a freezer can or vessel, comprising a bottom and an outer cylinder which is open at the top and an inner wall composed of a plurality of internally connected hollow disks to contain freezing fluid, in combination with a dasher conforming to said inner wall, means for circulating freezing fluid within said inner wall, and means for imparting relative rotation to said can and dasher.

19. In an ice cream freezer, an annular internally cooled freezer can having an outwardly flared top or rim, mounted for rotation upon a vertical axis, in combination with means for rotating said can, means for feeding custard to said can, other means for injecting air near the bottom of said can, a dasher within said can and means at the top of the can beneath said rim to receive semi-frozen liquid therefrom, substantially as described.

20. In an ice cream freezer, an annular internally cooled freezer can mounted for rotation upon a vertical axis, in combination with means for rotating said can, a custard feed-pipe or duct, a dasher, means integral with said dasher for injecting air near the bottom of said can, and means at the top of the can to receive semi-frozen liquid therefrom, substantially as described.

21. In an ice cream freezer, a rotary bottom, in combination with a cylinder secured thereto, an inner wall rising from said bottom and closed at the top, means for circulating a cooling fluid within said inner wall, a drain therefor, extending from a point near the top of said wall, and extending through said bottom, means for feeding custard to said cylinder and means at the top of said cylinder for the discharge of semi-frozen liquid, substantially as described.

In testimony whereof, I have hereunto set my hand, this 25th day of July, 1906, in the presence of two subscribing witnesses.

THEODORE L. VALERIUS.

Witnesses:
IRVING R. HIPPENMEYER,
SANFORD P. STARKS